Oct. 23, 1962 — E. F. BARRETT — 3,059,936
SEALING DEVICE
Filed March 10, 1958
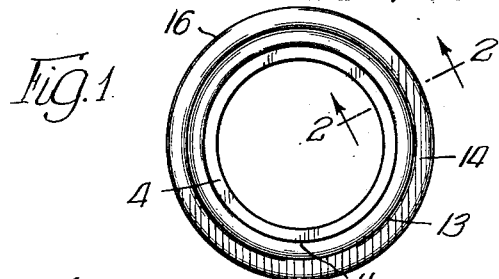
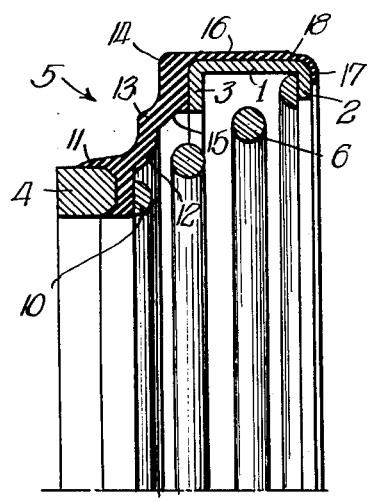
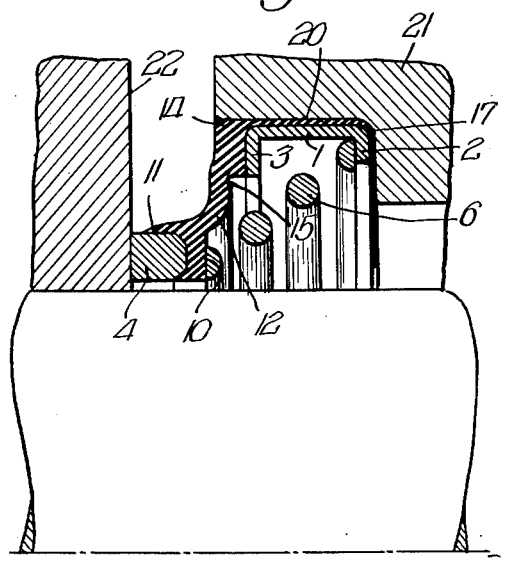
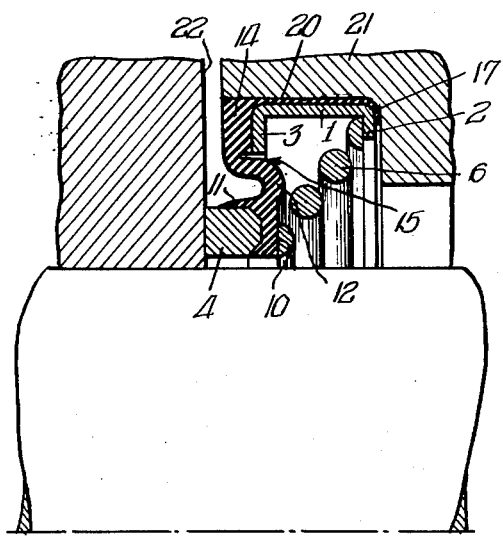
INVENTOR.
Edward F. Barrett,
BY

United States Patent Office 3,059,936
Patented Oct. 23, 1962

3,059,936
SEALING DEVICE
Edward F. Barrett, Westchester, Ill., assignor to Victor Manufacturing & Gasket Co., Chicago, Ill., a corporation of Illinois
Filed Mar. 10, 1958, Ser. No. 720,139
2 Claims. (Cl. 277—43)

This invention relates to face type sealing devices and has for its principal object the provision of a new and improved device of this kind.

It is a main object of the invention to provide a face type sealing device capable of fitting in a relatively small radial space between a shaft and a bore in a housing through which the shaft projects.

Another object of the invention is to provide a face type seal capable of fitting in a relatively small radial space and at the same time having relatively large movement of the sealing ring axially of the shaft.

Another object of the invention is to provide an improved bellows extended in seal-forming engagement between the sealing ring and base member of a sealing device that is adapted to fit in a relatively small radial space between a shaft and a bore in the housing.

Further objects of the invention not specifically mentioned here will be apparent from the detailed description and claims which follow, reference being had to the accompanying drawings in which a preferred embodiment of the invention is shown by way of example and in which:

FIG. 1 is a plan view of a sealing device embodying the teachings of the invention;

FIG. 2 is a cross sectional view taken along the line 2—2 of FIG. 1, looking in the direction of the arrow drawn to an enlarged scale and showing the sealing device in free position;

FIG. 3 is a view similar to FIG. 2, showing the sealing device in normal operating position in a machine; and FIG. 4 is a view similar to FIG. 3, showing the sealing device in practically completely compressed condition.

It is common practice to provide a sealing device having a base portion pressfitted into a bore in a housing through which a shaft projects, and having a seal ring that engages a companion radial surface on the shaft to form a fluid tight seal therebetween, which seal permits relative rotation of the housing and shaft. In seals of this type, an elastic bellows extends between the seal ring and base portion of the sealing device to form a fluid tight connection therebetween. Such bellows are composed of rubber or an elastomeric material that is not affected by the fluids with which it comes into contact.

Machine manufacturers oftentimes allow only relatively small space into which the sealing device can be placed, and the manufacturer of the sealing device is required to meet this space requirement together with other requirements imposed upon him by the machine manufacturers. Furthermore machine manufacturers specify a certain space axially of the shaft, into which the sealing device must be fitted, and further oftentimes require a specified axial movement of the seal ring during normal operation of the machine.

In one instance a sealing device was required to seal the space between a 1.25 inch shaft and a bore in a housing which was 2.062 inches in diameter. These dimensions allowed but .406 inch radially of the shaft, into which the sealing device had to be fitted; and in order to maintain specified clearance between the shaft and seal ring, this space radially was reduced to 0.375 inch. In addition to the foregoing, the sealing device was required to have a normal working length of but 0.562 inch and a required axial movement of the seal ring of not less than 0.125 inch. The sealing device of the present invention fulfills these requirements.

As will be seen in FIGS. 1 and 2, in which latter figure the sealing device is shown in its free state, the device consists of a base ring 1 formed of metal and having a rear flange 2 and a front flange 3, which latter flange is slightly wider radially than is the flange 2. The seal ring 4 composed of a low friction rigid material, is connected to the base ring by a bellows indicated generally at 5. A conical spring 6 abuts against the rear flange 2 and against a portion of the bellows engaging the rear face of the seal ring 4, and completes the device. It is to the bellows that the present invention particularly relates.

Seals of the present type are old in the prior art of which I am aware, although none of those seals can be fitted for successful operation within the space limitations that can be met by the present device. The bellows of the prior art are composed either of a combination of cylindrical and radial portions or of frusto-conical radial and cylindrical portions, with the smaller diameter of the frusto-conical portion disposed at the end thereof that is remote from the sealing ring. As the sealing ring is moved towards the base of the sealing device, the bellows telescopes adjacent its radial portion, moving into a Z or S shape configuration at the end of the inward movement of the seal ring. Furthermore, in these prior art seals, the bellows has been designed to bulge in a direction away from the spring by which the seal ring is maintained in engagement with a companion sealing surface; that is to say, in sealing devices in which the bellows is located inside of the spring, the bellows has been shaped to bulge forwardly and outwardly as the seal ring moves towards the base of the device; and in devices in which the spring is located outside of the bellows, the bellows has been arranged to bulge inwardly as the seal ring moves towards the base of the device. The bellows of the present invention is constructed differently and operates in an entirely different manner from these prior art devices.

As will be seen best in FIG. 2, the bellows of the present invention consists of a radial portion 10 and a generally cylindrical portion 11, which together define a forwardly opening annular groove in which the seal ring 4 is fixed. An arcuate section 12 extends rearwardly and outwardly from the junction of the portions 10 and 11, which arcuate section 12 forms a concave groove in the outer surface of the bellows. At its outer end the arcuate portion 12 blends into a generally frusto-conical portion 13 which extends outwardly and rearwardly from the portion 12. The portion 13, while generally frusto-conical, may have arcuate configuration in its outer face if desired. A radial portion 14 extends outwardly from the outer edge of the frusto-conical portion 13 and it will be noted that this radial portion 14 is approximately twice as thick as the portions 12 and 13, forming a flex ring indicated at 15. A relatively thin outer cylindrical portion 16 extends rearwardly from the outer radial portion 14 and inwardly at the rear end of the base member 1, as indicated at 17. A lead-in band 18 may be provided in the outer surface of the wall 16 if desired. The portions 10 and 11 of the bellows are bonded to the outer and rear faces of the seal ring 4 and the portions 14, 16 and 17 are bonded to the outer faces of the base ring 1.

It will be noted that the generally cylindrical portion 11 is tapered slightly on its outer face with the smaller end of the portion located at the end thereof adjacent the sealing face of the seal ring 4, the outer surface of the portion preferably forming an angle of approximately 13° with respect to the axis of the device.

It will also be noted that the small diameter end of portion 13 of the bellows is located at the end thereof adjacent the seal ring 4 and that the angle of the portion 13 with respect to the axis of the bellows is much greater than the angle of the outer surface of portion 11, preferably being approximately 50°.

As will be seen in FIG. 2, when the device is in its free state, the bellows assumes a generally frusto-conical shape with its base at the base of the device and its apex at the seal ring.

As will be seen in FIG. 3, when the sealing device is installed in a bore 20 in a housing 21 and the companion sealing surface 22 is positioned against the seal ring 4, the distance between the rear end of the seal device and the sealing face of the seal ring 4 is reduced to the specified working length of the sealing device, which in the device shown by way of example is 0.562 inch. It will be noted that the bellows is flexed mainly along the flex line 15 and that it is flattened axially with the portion 10 approaching alignment with the portion 14.

As will be seen in FIG. 4, should the shaft and member thereon that carries the sealing face 22 move into close proximity to the housing 21, with the consequent movement of the seal ring 4 inwardly with respect to the base 1, the bellows assumes a definite U shape and that flexing thereof has occurred mainly around the flex line 15 and the junction of the arcuate portion 12 with the portion 13. The forward face of the outer radial portion 14 remains in line with the face of the housing 21, and as a result, even though the seal ring should be moved into the base portion of the sealing device sufficiently to bring its sealing face substantially in line with the face of the housing member 21, the bellows will not be engaged by the sealing face 22 and no damage to the bellows will result.

In the sealing device illustrated by way of example, the distance between the rear face of portion 17 and the front face of the seal ring 4 is 0.625 inch when the device is in its free state. The distance between the rear face of portion 17 and the front face of portion 14 is 0.375 inch. Thus if the seal ring 4 is moved axially towards the base of the device, it will move 0.250 inch before its front face moves into alignment with the front face of portion 14. While it is not intended that the seal ring 4 will move through such a wide range axially of the device during normal operation of the machine, nevertheless it is capable of movement over this range without damage to the bellows.

During such inward movement of the seal ring 4, the spring moves rearwardly into the position shown in FIG. 4, and notwithstanding that the bulging of the bellows is toward the spring, the bellows does not engage the spring and hence is not damaged thereby.

Thus it will be seen that through the bellows arrangement of the present invention a sealing device can be inserted in rather cramped quarters radially and axially, and is capable of more axial movement of the seal ring than is required, without damage to the sealing device. The dimensions given hereinbefore refer to a specific adaptation of the device and are given for the purpose of illustration only, as suitable changes in the dimensions will be required to tailor the sealing device to particular requirements imposed by the machine manufacturer.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. A sealing device in which a seal ring and a channel shaped metallic base ring are connected together by a bellows composed of an elastomeric material, which bellows bulges rearwardly of the device as the seal ring is moved axially towards the base ring, said bellows comprising radial and generally cylindrical portions fixed to the seal ring; an arcuate portion extending from the junction of said radial and generally cylindrical portions and forming a concave section in the outer surface of the bellows; a frusto-conical portion extending from said arcuate portion and disposed with its smallest diameter at its junction with said arcuate portion; an outer radial portion axially thicker than and extending from said frusto-conical portion and fixed to the forward end of said base ring; a generally cylindrical portion extending from said outer radial portion and fixed to the outer surface of said base ring; and a conical spring extending between the base ring and radial portion that is fixed to the seal ring, towards which spring the bellows bulges as the seal ring is moved axially towards said base ring.

2. A bellows for a fluid seal composed of an elastomeric material and comprising: an inwardly extending radial portion having an integral generally cylindrical portion at its outer periphery, which portions together define an annular forwardly opening groove adapted to receive a seal ring; an arcuate portion extending rearwardly and outwardly from the junction of said radial and generally cylindrical portions and forming an arcuate groove in the outer face of the bellows; a frusto-conical portion extending outwardly and rearwardly from the outer edge of said arcuate portion; an outer radial portion thicker than the frusto-conical portion and extending outwardly from the outer edge of the frusto-conical portion to which it is joined with the rear face of the frusto-conical portion positioned forwardly of the rear face of the outer radial portion thereby to form a flex line at the junction of the portions; and a generally cylindrical portion extending rearwardly from the outer edge of said outer radial portion.

References Cited in the file of this patent

UNITED STATES PATENTS

| 2,347,118 | Matter | Apr. 18, 1944 |
| 2,469,065 | Coss | May 3, 1949 |
| 2,522,231 | Loftis | Sept. 12, 1950 |
| 2,614,874 | Helfrecht | Oct. 21, 1952 |
| 2,784,016 | Heimbuch | Mar. 5, 1957 |
| 2,824,760 | Gits | Feb. 25, 1958 |
| 2,881,014 | Amirault et al. | Apr. 7, 1959 |
| 2,881,015 | Wahl | Apr. 7, 1959 |

FOREIGN PATENTS

| 631,981 | Great Britain | Nov. 14, 1949 |
| 963,942 | France | Jan. 18, 1950 |